United States Patent [19]

Schaeffer et al.

[11] Patent Number: 5,674,610
[45] Date of Patent: Oct. 7, 1997

[54] METHOD FOR CHROMIUM COATING A SURFACE AND TAPE USEFUL IN PRACTICING THE METHOD

[75] Inventors: Jon C. Schaeffer, Milford; Mark A. Rosenzweig, Hamilton; Warren D. Grossklaus, Jr., West Chester, all of Ohio; Robert J. Van Cleaf, Greenwood, S.C.; Frederick S. Kaempf, Delanson, N.Y.

[73] Assignee: General Electric Company, Cincinnati, Ohio

[21] Appl. No.: 409,395

[22] Filed: Mar. 24, 1995

[51] Int. Cl.⁶ .................................................... C09J 7/02
[52] U.S. Cl. ........................................ 428/344; 428/354
[58] Field of Search ................................ 428/343, 354, 428/344

[56] References Cited

U.S. PATENT DOCUMENTS 4,004,047  1/1977  Grisik ........................ 427/142
4,726,101  2/1988  Draghi et al. ................ 29/156.8 B Primary Examiner—Jenna Davis
Attorney, Agent, or Firm—Andrew C. Hess; David L. Narciso

[57] ABSTRACT

Chromium is deposited on a surface using a coating tape having a source layer including a powdered source of chromium, a solid reactant that reacts with solid chromium at elevated temperature to produce a gaseous chromium-containing compound, an inert powder dispersed with the powdered source of chromium, and a binder. Preferably, a porous media layer including a porous media material and a binder is affixed to the source layer. The coating tape is positioned adjacent to the surface of the substrate, with the porous media layer, where present, in contact with the surface. The coating tape and substrate are placed into a container, and the container is heated to elevated temperature in a non-oxidizing atmosphere. The gaseous chromium-containing compound is produced and chromium is deposited from the gaseous chromium-containing compound onto the surface of the substrate.

16 Claims, 2 Drawing Sheets

METHOD FOR CHROMIUM COATING A SURFACE AND TAPE USEFUL IN PRACTICING THE METHOD

BACKGROUND OF THE INVENTION

This invention relates to the coating of the surface of a metallic substrate, and, more particularly, to the application of a chromium coating to the surface.

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. In the turbine, the flow of gases is deflected by sets of turbine vanes to impinge upon a series of turbine blades mounted to turbine wheels supported on the shaft. The flow of gas turns the turbine, which turns the shaft and provides power to the compressor. The hot exhaust gases flow from the back of the engine, driving it and the aircraft forwardly.

The hotter the exhaust gases, the more efficient is the operation of the jet engine. There is thus an incentive to raise the exhaust combustion gas temperature. The maximum temperature of the combustion gases is normally limited by the materials used to fabricate the turbine blades and turbine vanes of the turbine, upon which the combustion gases directly impinge when they are at their hottest temperatures.

In current practice, the turbine blades and turbine vanes are made of nickel-base or cobalt-base superalloys. The superalloys are selected and processed to be strong, creep resistant, and fatigue resistant. However, the superalloys themselves are not highly resistant to progressive damage by oxidation, hot corrosion, and erosion when exposed to the flowing hot combustion gases. These damage mechanisms normally establish the maximum operating lives of the turbine blades and turbine vanes. To extend the operating lives, the turbine blades and turbine vanes are coated with various types of coatings that protect them from oxidation, corrosion, and erosion.

The turbine blades and vanes are arranged in stages according to the pressure and temperature of the exhaust gases that impinge upon them. Different coatings are used for the components of the various stages. In the high-pressure stages, thermal barrier coating systems or aluminum-containing coatings are employed. In the low-pressure stages, chromium coatings are favored.

The coatings are applied during the fabrication of the turbine components. The coatings degrade during service as a result of continued exposure to the hot exhaust gases and temperature changes during the operating cycles of the engine. The coatings can also be damaged during handling in the course of manufacturing, installation, and inspection. In all of these circumstances, repair of the coatings may be required.

Various techniques have been proposed to repair the chromium coatings of the low-pressure turbine blades and turbine vanes. These repair techniques include, for example, overchromiding by applying a new chromium coating over the entire old coating, applying chromium metal in a slurry or tape followed by sintering, and brush plating. Only the overchromiding process has met with any degree of success. This approach is operable, but generally must be accomplished by returning the component to the original manufacturer, which can be inconvenient and costly.

There is a need for a better approach to applying a chromium coating to a metallic surface, particularly under field-repair conditions. Such an approach would be of value for the repair of aircraft turbine components, but would also be useful in a variety of other situations where chromium coatings are used. The present invention fulfills this need, and further provides related advantages.

SUMMARY OF THE INVENTION

This invention provides a method for applying a chromium coating to the surface of a substrate. The coating can be deposited locally, making the approach ideal for the repair of damaged components. The deposition procedure requires only a furnace and does not require complex coating equipment. The coating can therefore be applied in field repairs without returning the component to its manufacturer. The invention also provides a convenient and economical coating tape that is used in the coating process.

As used herein, a "chromium coating", sometimes termed a "chromide coating" in the art, is a coating which contains chromium and that is applied to the surface of the substrate in excess of any amount that may be present in the substrate alloy. During service, the chromium coating is typically not pure chromium, but includes a concentration of the elements present in the substrate as a result of the interdiffusion of the coating and the substrate. Even where the chromium coating as initially applied is substantially pure chromium, interdiffusion with the substrate typically occurs rapidly as a result of exposure at elevated temperatures. Such interdiffusion during application of the coating or thereafter during a heat treatment or service is acceptable and desirable to increase adherence of the coating to the substrate.

In accordance with the invention, a method of depositing chromium on a surface of a metallic substrate comprises the steps of providing a metallic substrate having a surface, and supplying a solid source of chromium and a solid reactant that is operable to react with solid chromium at elevated temperature to produce a gaseous chromium-containing compound. The method further includes heating the solid source of chromium and the solid reactant to elevated temperature to produce the gaseous chromium-containing compound, and contacting the gaseous chromium-containing compound to the surface of the substrate, whereupon chromium is deposited from the gaseous chromium-containing compound onto the surface of the substrate. Care is taken to remove and prevent the re-formation of tenacious, adherent surface oxides on the substrate that would interfere with the deposition of the chromium coating.

The invention is preferably practiced using a coating tape to supply the reactants in a convenient form and a closed reactor to prevent the escape of the chromium-containing gas. In accordance with this aspect of the invention, a method of depositing chromium on a surface of a metallic substrate comprises the steps of providing a metallic substrate having a surface and supplying a coating tape. The coating tape comprises a source layer including a powdered source of chromium, a solid reactant that is operable to react with solid chromium at elevated temperature to produce a gaseous chromium-containing compound, an inert powder dispersed with the powdered source of chromium, and a binder. The method further includes positioning the coating tape adjacent to the surface of the substrate, placing the coating tape and substrate into a container and sealing the container, and heating the coating tape and the substrate to elevated temperature within the sealed container. Again, care is taken to avoid surface oxides on the substrate that could interfere with the chromium deposition.

The coating tape can further include a porous media layer of a porous media material affixed to the source layer. The porous media layer physically separates the source layer from the substrate. Solid reactant material from the source layer is prevented from contacting and possibly reacting with the substrate, and the inert powder in the source layer cannot become embedded into the substrate as the chromium is deposited. Chromium-bearing gas from the source layer passes through the porous media layer to reach the substrate. The porous media material is typically a mixture of an inert powdered material and a binder. When it is used, the two-layer tape structure is positioned with the porous media layer in contact with the substrate.

The present invention also extends to the coating tape, including both the one-layer embodiment having only the source layer and the two-layer embodiment having the source layer and the porous media layer.

The source layer is preferably formed of a mixture of powdered chromium, a solid halide such as ammonium fluoride or ammonium chloride as the solid reactant (also sometimes termed an "activator"), an oxide powder such as chromium oxide powder mixed with the powdered chromium to prevent it from agglomerating and sintoting, and an organic binder. The porous media layer is preferably formed of a mixture of a metallic oxide such as aluminum oxide or chromium oxide and a binder, or a ceramic gauze. In each type of tape, the organic binder is present to bind the constituents together in the tape during manufacture, shipment, storage, and placement of the tape. The binder vaporizes or burns away as the tape is heated.

The use of the coating tape that produces a gaseous chromium-containing compound in the preferred application process is a particularly convenient approach to depositing the chromium onto the surface of the substrate. It is not necessary to apply a chromium vapor overpressure to the entire part being chromided. The chromium in the tape is not melted, so that there is no risk of the unintentional deposition of chromium masses on the substrate which would adversely affect its airfoil performance. The approach requires only that the tape be applied to the surface of the substrate, the substrate and applied tape be placed into a container, and the substrate and applied tape be heated to a temperature sufficient that the reaction and deposition can occur.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 5 is an elevational view of a two-layer coating tape;

DETAILED DESCRIPTION OF THE PREFERRED EMBODIMENTS

Figure 1:
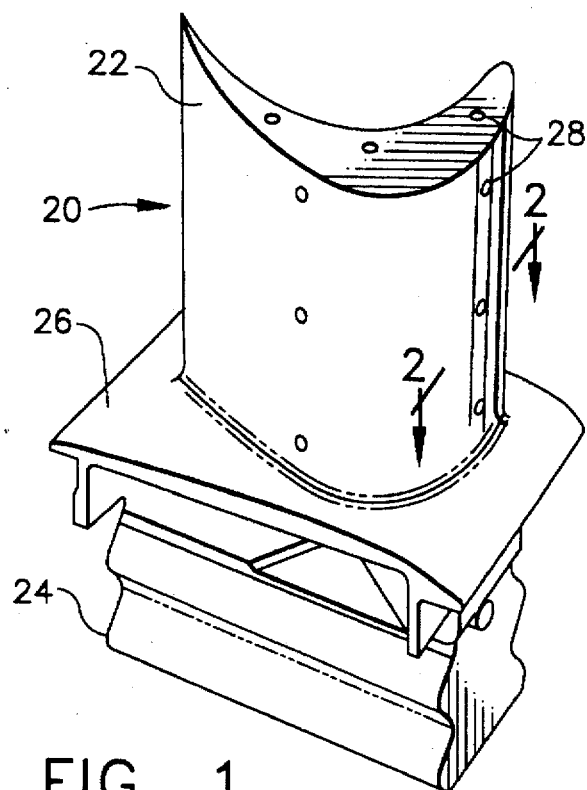
FIG. 1 is a perspective view of a gas turbine component.

FIG. 1 depicts a component of a gas turbine engine such as a turbine blade or turbine vane, and in this case is depicted as a turbine blade 20. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of cooling channels desirably extend through the interior of the airfoil 22, ending in openings 28 in the surface of the airfoil 22. A flew of cooling air is directed through the cooling channels, to reduce the temperature of the airfoil 22.

Figure 2:
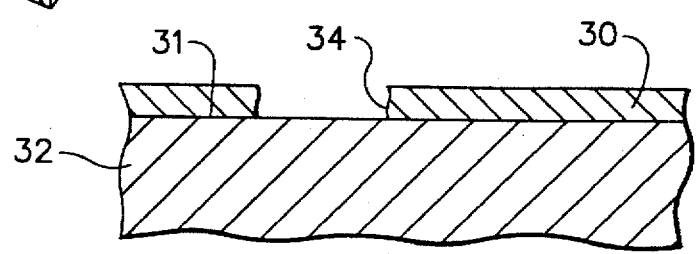
FIG. 2 is a sectional view through the component of FIG. 1, taken generally along line 2—2, illustrating a chromium coating on the surface of the component.

FIG. 2 illustrates in a section through the airfoil 22 a chromium coating 30 deposited upon a surface 31 of the turbine blade 20, which thereby acts as a substrate 32. The substrate 32 may be formed of any operable material, but a preferred base metal from which the substrate 32 is formed is a nickel-base superalloy such as Rene 77, Rene 80, or Rene 108. The preferred superalloy substrate is Rene 77, which has a nominal composition, in weight percent, of 15 percent cobalt, 14.2 percent chromium, 4.3 percent aluminum, 3.4 percent titanium, 4.2 percent molybdenum, balance nickel and trace elements.

The chromium coating 30, as initially deposited upon the substrate 32, is typically continuous with a thickness of about 0.0005 to about 0.0015 inches, nominally about 0.001 inches. However, the continuous coating may be interrupted at a flaw 34, where the coating 30 is partially or completely (as illustrated) removed from the surface 31 of the substrate 32. Where present, the chromium coating 30 protects the substrate 32 from damage by oxidation, hot corrosion, and erosion by the hot exhaust gas. Where the chromium coating 30 is removed at a flaw 34, the hot exhaust gas can contact the unprotected substrate 32 and quickly damage it by these mechanisms.

Flaws 34 occasionally occur due to damage during manufacturing, handling, installation, or service. Flaws can be detected during inspections. The preferred application of the present invention is to repair such flaws 34. The invention will be described in relation to the use of a coating tape to make the repair, because such a tape is convenient for field repairs.

Figure 3:
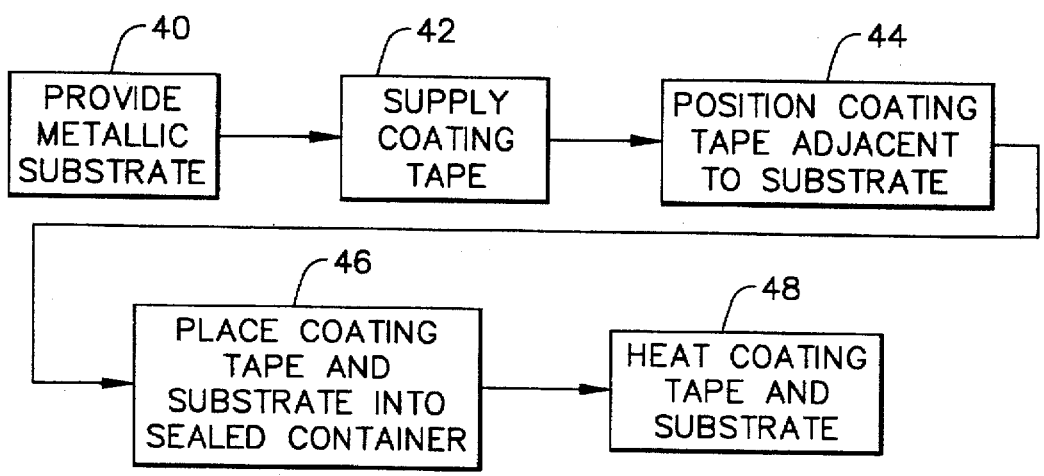

A method for practicing the invention is depicted in FIG. 3. A metallic substrate 32 is provided, numeral 40. The metallic substrate may be a turbine blade or turbine vane, another gas turbine component, or other article. The only limitation on the choice of the metallic substrate is that it be suitable for the application of a chromium coating. The surface of the substrate is cleaned of organic residue and oxides by conventional cleaning techniques. The presence of tenacious oxides on the surface of the substrate interferes with the subsequent chromium deposition.

Figure 4:
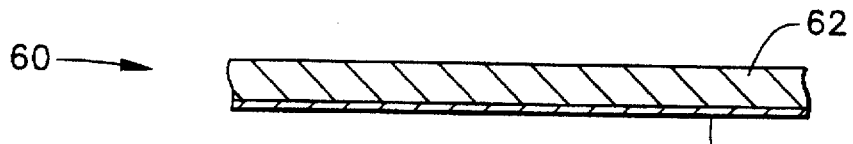
FIG. 4 is an elevational view of a one-layer coating tape.
Figure 5:
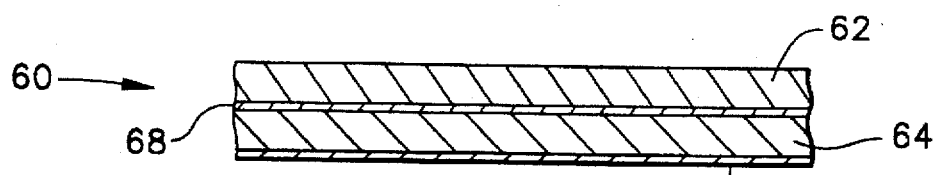
FIG. 5 is a block diagram of one embodiment of the approach of the invention.

A coating tape 60 is supplied, numeral 42. Two embodiments of the coating tape 60 are illustrated in FIGS. 4 and 5. In a one-layer coating tape embodiment of FIG. 4, there is a single source layer 62. In a two-layer coating tape embodiment of FIG. 5, there is a source layer 62 and a porous media layer 64. Additionally, there may be adhesive layers as needed and which will be described subsequently. (The adhesive layers are not counted in the terminology "one-layer" and "two-layer", inasmuch as the presence and type of the adhesive layers can be varied for different applications.)

The source layer 62 is a mixture of a solid powdered source of chromium, a solid reactant that is operable to react with solid chromium at elevated temperature to produce a gaseous chromium-containing compound, an inert powder dispersed with the solid powdered source of chromium, and a binder. Preferably, the solid powdered source of chromium is chromium powder, typically −100 mesh, high-purity chromium powder.

Preferably, the solid reactant (also termed an "activator") is a solid halide compound, such as ammonium fluoride or ammonium chloride. Preferably, the inert powder is an oxide powder such as chromium oxide powder, typically of a size of −400 mesh. The inert powder serves to prevent the chromium powder from sintering and densifying during the subsequent heating step, which would prevent the chromium-containing gas from reaching the substrate. Preferably, the binder is an organic binder such as an acrylic resin.

Even more preferably, the source layer 62 is prepared by mixing from about 60 to about 90 parts by weight of chromium powder and from about 5 to about 39 parts by weight of chromium oxide powder, and then adding to this mixture from about 1 to about 5 parts by weight of ammonium fluoride or ammonium chloride. Most preferably, the source layer 62 includes about 89 parts by weight of chromium powder, about 10 parts by weight of chromium oxide powder, and about 1 part by weight of ammonium fluoride, with which the binder is mixed. Typically, about 85 parts by weight of this mixture is mixed with up to about 15 parts by weight of the binder, to form a mixture with a suitable consistency for forming the source layer.

The porous media layer 64, used in the two-layer embodiment of FIG. 5, is made of an inert material through which the chromium-containing gas passes but does not deposit upon. The porous media layer 64 can be a ceramic gauze or the like. The porous media layer 64 can also be a mixture of a ceramic powder, such as aluminum oxide or chromium oxide, and a binder. In the latter case, the porous media layer 64 is a mixture of about 85 parts by weight of the ceramic powder and about 15 parts by weight of an organic binder such as an acrylic resin.

The source layer 62 and the porous media layer 64 are separately manufactured by known processes for the fabrication of such layers. In each case, the constituents are mixed together and formed into a layer by extrusion, rolling, a doctor blade, or the like. The source layer 62 is preferably from about 0.010 to about 0.015 inches thick, and the porous media layer 64 is preferably from about 0.015 to about 0.025 inches thick, as fabricated. In a working embodiment, the source layer 62 was 0.013 inches thick And the porous media layer 64 was 0.020 inches thick. Alternatively, for the two-layer coating tape 60 of FIG. 5, the source layer 62 and the porous media layer 64 can be individually mixed, and thereafter co-extruded, co-rolled, or the like to produce the two-layered tape.

A first adhesive layer 66 is preferably provided to fix the coating tape 60 to the substrate 32. In the one-layer embodiment of FIG. 4, the first adhesive layer 66 is provided on one side of the source layer 62. In the two-layer embodiment of FIG. 5, the first adhesive layer 66 is provided on one side of the porous media layer 64, the side which does not lie in facing contact to the source layer 62. The adhesive used in the first adhesive layer 66 is one that will hold the coating tape 60 to the substrate 32 during heating, but thereafter will vaporize or burn away at elevated temperature. The preferred adhesive in the first adhesive layer 66 is a pressure sensitive adhesive provided as a solution of phenolic resin and nitro rubber in a solvent. In some cases, the first adhesive layer 66 may be omitted if the coating tape 60 is held in place against the substrate 32 by some other technique, such as an applied pressure.

A second adhesive layer 68 may be present between the source layer 62 And the porous media layer 64 in the two-layer embodiment of FIG. 5. (No second adhesive layer 68 is used with the one-layer embodiment of FIG. 4.) The second adhesive layer 68 may also not be needed for the two-layer embodiment, where the source layer 62 and the porous media layer 64 are held together by some other technique, as by their mechanical interlocking produced by a co-production process such as co-extrusion. Where present, the second adhesive layer 68 is made of an adhesive that will hold the source layer 62 to the porous media layer 64 during handling, storage, and heating, but thereafter will vaporize or burn away at elevated temperature. The preferred adhesive in the second adhesive layer 68 is the same as the adhesive of the first adhesive layer Returning to the method illustrated in FIG. 3, the coating tape 60 is positioned adjacent to the substrate, numeral 44. The coating tape is typically provided with a paper backing on the first adhesive layer 66 to protect it during handling. The paper backing is first peeled away, and the coating is applied to the substrate 32.

Figure 6:
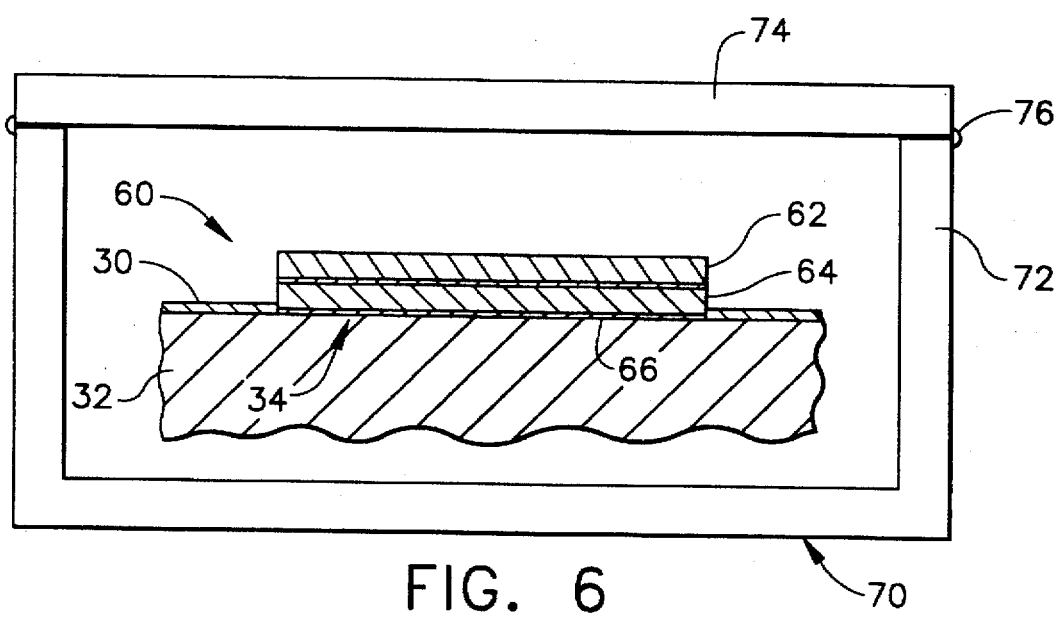
FIG. 6 is a schematic sectional view illustrating one embodiment of the application of the coating tape to the surface of the component.
Figure 7:
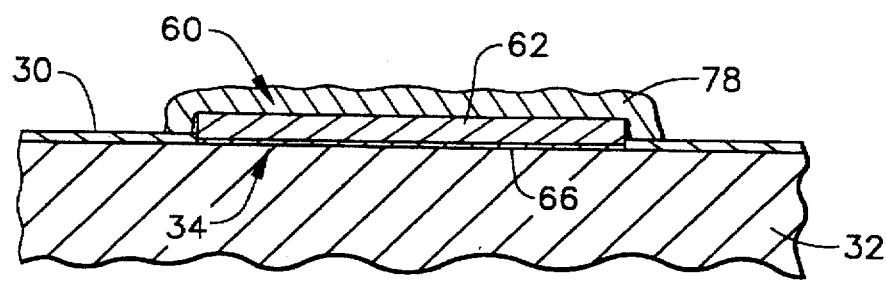
FIG. 7 is a schematic sectional view illustrating a second embodiment of the application of the coating tape to the surface of the component.

FIGS. 6 and 7 illustrate the positioning of the two-layer coating tape and the one-layer coating tape, respectively, in contact with the substrate 32. In each case, the first adhesive layer 66 is placed into contact with the substrate 32. For the two-layer coating tape of FIG. 6, the coating tape 60 is oriented such that the porous media layer 64 is between the substrate 32 and the source layer 62. The coating tape 60 is normally applied over a flaw One advantage of the use of the coating tape is that it may be cut to size to fit the flaw. Another advantage is that the coating tape may be bent to conform to curved or irregular surfaces (although the surfaces of FIGS. 6 and 7 are illustrated as flat).

The coating tape 60 and substrate 32 are placed into a container 70, in the preferred embodiment. The container 70 includes a bottom 72 and a top 74. The substrate 32 with attached coating tape 60 is placed into the bottom 72. The top 74 is placed into position and closed. Preferably, the top 74 is not sealed to the bottom 72, as a loosely closed container has been found sufficient as long as a proper atmosphere is maintained around the container 70. Alternatively, the container 70 could be sealed, as with a weld 76 of the top to the bottom. The container 70 is preferably made of a metal such as Inconel 625, Inconel 601, or stainless steel, and the seal 76, where used, is preferably a weld.

The container 70 preferably is sized so that the substrate 32 fits therein with as small a clearance as reasonably possible. One important function of the container 70 is to prevent the escape of chromium-containing gas from the location where the chromium layer is to be deposited, and for this reason there is as little excess space within the container as possible. Any excess space within the container may optionally be, and preferably is, filled with a substance upon which the chromium will not readily deposit, such as aluminum oxide or chromium oxide powder. Such a filler also aids in holding the coating tape 60 in contact with the surface of the substrate.

It is important that the portion of the surface of the substrate upon which the chromium is to be deposited not have an oxide layer that could interfere with the deposition. As noted earlier, any pre-existing tenacious oxide is cleaned from the surface prior to contacting the coating tape 60 to the surface. To prevent formation of any further oxide during heating and chromium deposition, the entire container, with the enclosed substrate and coating tape, is surrounded with a non-oxidizing atmosphere (Alternatively, if the container is sealed, the interior of the container would initially be filled with the non-oxidizing atmosphere.) The atmosphere is desirably hydrogen or argon gas, or a mixture thereof. A positive pressure of the non-oxidizing gas is normally maintained to prevent leakage of oxygen into the container.

An alternative approach also within the scope of the term "place the coating tape and substrate into a container" is illustrated in FIG. 7. Here, a barrier cover 78 is placed over the coating tape 60 and a small portion of the adjacent region of the substrate 32. The barrier cover 78 has substantially the same functions as the container 70: specifically preventing the chromium-containing gas from escaping, forcing the gas to contact the substrate 32 in the desired area, and excluding oxygen from the region upon which the chromium is to be deposited. The barrier cover 78 is preferably made of a ceramic such as non-porous aluminum oxide, and is at least about 0.010 inches thick. A non-oxidizing purge gas such as hydrogen or argon is passed over the exterior of the barrier cover to exclude oxygen.

FIG. 6 illustrates the two-layer coating tape in conjunction with the container, while FIG. 7 illustrates the one-layer coating tape in conjunction with the barrier cover. These arrangements are intended to depict possible combinations, but the invention is not so limited. For example, the one-layer coating tape can be used in conjunction with the container, and the two-layer coating tape can be used in conjunction with the barrier cover.

The coating tape and substrate are heated to a reaction temperature, numeral 48. A preferred reaction temperature is 2000° F. At this temperature, the solid reactant reacts with the source of chromium to produce a chromium-containing gas. In the most preferred case, Ammonium fluoride reacts with chromium powder to produce chromium fluoride gas. The chromium-containing gas diffuses to the substrate 32 (through the porous media layer 64 in the two-layer coating tape). When the chromium-containing gas contacts the substrate 32, it decomposes to deposit high-purity chromium thereon. The process continues until a desired thickness of deposited chromium is produced.

The approach of the invention has been practiced using the two-layer coating tape and container embodiment illustrated in FIG. 6 (except that the container was not sealed) and the method of FIG. 3. A two-layer coating tape 60 was prepared using the most preferred embodiment discussed previously. The coating tape 50 was applied to a Rene 77 substrate, placed into the container, and heated to 2000° F. for 8 hours in a hydrogen atmosphere. After cooling, the remnant of the tape was removed and the coating was inspected and analyzed. The coating was about 0.001 inch thick. The coating was predominantly chromium at its upper surface, with a relatively small concentration of the elements originally present in the substrate. At increasing depths within the coating, the coating contained an increasing amount of the elements found in the substrate. The presence of the substrate elements is expected as a result of interdiffusion of the chromium and the substrate, and such interdiffusion is both acceptable and desirable to ensure adherence of the coating to the substrate.

This invention has been described in connection with specific embodiments and examples. However, those skilled in the art will recognize various modifications and variations of which the present invention is capable without departing from its scope as represented by the appended claims.

What is claimed is:

1. A coating tape useful in applying a chromium coating to a surface of a substrate, comprising:

a source layer including a powdered source of chromium, a solid reactant that is operable to react with solid chromium at elevated temperature to produce a gaseous chromium-containing compound, an inert powder dispersed with the powdered source of chromium, the inert powder comprising chromium oxide powder, and a source layer binder; and a porous media layer including an inert powdered ceramic and a binder, the porous media layer having a first side affixed to the source layer to form the coating tape.

2. The coating tape of claim 1, wherein the source layer comprises from about 60 to about 90 parts by weight of chromium powder as the source of chromium, from about 1 to about 5 parts by weight of a halide compound as the solid reactant, from about 5 to about 39 parts by weight of an inert oxide powder, and a polymeric layer binder.

3. The coating tape of claim 1, further including an adhesive on a second side of the porous media layer.

4. The coating tape of claim 1, wherein the source layer binder is an acrylic resin.

5. A coating tape useful in applying a chromium coating to a surface of a substrate comprising:

a source layer comprising a powered source of chromium, a solid reactant that is operable to react with solid chromium at elevated temperature to produce a gaseous chromium-containing compound, and an inert powder dispersed with the powered source of chromium; and a ceramic porous media layer having a first side affixed to the source layer.

6. The coating tape of claim 5, wherein the source layer comprises from about 60 to about 90 parts by weight of chromium powder as the source of chromium, from about 1 to about 5 parts by weight of a halide compound as the solid reactant, and from about 5 to about 39 parts by weight of an inert oxide powder.

7. The coating of tape of claim 5 wherein the source layer comprises about 89 parts by weight of chromium powder, about 1 part by weight of ammonium fluoride, and about 10 parts by weight of chromium oxide powder.

8. The coating tape of claim 5, further including an adhesive on a second side of the porous media layer.

9. The coating tape of claim 8, wherein the adhesive comprises phenolic resin and nitro rubber.

10. The coating tape of claim 5, wherein the solid reactant is a halide compound.

11. The coating tape of claim 10, wherein the halide compound is selected from the group consisting of ammonium chromide and ammonium fluoride.

12. The coating tape of claim 5, wherein the source layer further includes a source layer polymeric binder.

13. The coating tape of claim 5, wherein the source layer polymeric binder is an acrylic.

14. The coating tape of claim 5, wherein the ceramic porous media layer comprises a ceramic gauze.

15. The coating tape of claim 5, wherein the ceramic porous media layer comprises a mixture of a ceramic media powder and an organic porous media layer binder.

16. The coating tape of claim 5, wherein the ceramic porous media layer comprises a mixture of about 85 parts by weight of a ceramic media powder and about 15 parts by weight of an organic porous media layer binder.

* * * * *